(12) United States Patent
Nichols

(10) Patent No.: US 8,805,418 B2
(45) Date of Patent: Aug. 12, 2014

(54) METHODS AND SYSTEMS FOR PERFORMING ACTIONS BASED ON LOCATION-BASED RULES

(75) Inventor: Michael R. Nichols, La Canada-Flintridge, CA (US)

(73) Assignee: United Video Properties, Inc., Santa Clara, CA (US)

(*) Notice: Subject to any disclaimer, the term of this patent is extended or adjusted under 35 U.S.C. 154(b) by 0 days.

(21) Appl. No.: 13/336,678

(22) Filed: Dec. 23, 2011

(65) Prior Publication Data

US 2013/0165152 A1 Jun. 27, 2013

(51) Int. Cl.
*H04W 24/00* (2009.01)

(52) U.S. Cl.
USPC ............ 455/456.3; 455/456.1; 455/456.2; 455/456.4; 455/456.5; 455/456.6; 455/414.2; 455/414.3; 455/457

(58) Field of Classification Search
USPC .......... 455/456.1, 456.2, 456.3, 456.4, 456.5, 455/456.6, 414.2, 414.3, 457
See application file for complete search history.

(56) References Cited

U.S. PATENT DOCUMENTS

| | | | |
|---|---|---|---|
| 2002/0111172 A1* | 8/2002 | DeWolf et al. | 455/456 |
| 2010/0015999 A1* | 1/2010 | Belz et al. | 455/456.2 |
| 2012/0003989 A1* | 1/2012 | Gravino | 455/456.1 |

* cited by examiner

*Primary Examiner* — Khalid Shaheed
(74) *Attorney, Agent, or Firm* — Ropes & Gray LLP

(57) ABSTRACT

Methods and systems for performing actions based on location-based rules are provided. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified. Based on the location-based rule, the location, and the entertainment profile of the user, the action may be performed.

38 Claims, 14 Drawing Sheets

```
<?xml version="1.0" encoding="ISO-8859-1" ?>
<GEO-FENCE>
<GEO-FENCE_ID>1</GEO-FENCE_ID>
<LOCATION_LAT>40.760456</LOCATION_LAT>
<LOCATION_LON>-73.984337</LOCATION_LON>
<SHAPE>CIRCLE</SHAPE>
<DIAMETER>1 mile</DIAMETER>
<TIME>Always</TIME>
</GEO-FENCE>
```

FIG. 9

```xml
<?xml version="1.0" encoding="ISO-8859-1" ?>
<RULE>
<CONDITIONS>(MUED is within "Geo-Fence 1" 30 minutes before a show time) AND (the user of the MUED is a HARRY POTTER fan)</CONDITIONS>
<MUED_ACTION>an offer for 15% off of the purchase of two tickets for the 7pm showing at the AMC Theatre will be presented on the MUED</MUED_ACTION>
<HUED_ACTION>No Action</HUED_ACTION>
</RULE>
```

FIG. 14

```
<?xml version="1.0" encoding="ISO-8859-1" ?>
<LATITUDE_LONGITUDE>
<MUED_ID>1</MUED_ID>
<MUED_USER_ID>3</MUED_USER_ID>
<LATITUDE>40.760456</LATITUDE>
<LONGITUDE>-73.984337</LONGITUDE>
</LATITUDE_LONGITUDE>
```

FIG. 16

METHODS AND SYSTEMS FOR PERFORMING ACTIONS BASED ON LOCATION-BASED RULES

BACKGROUND OF THE INVENTION

An overwhelming amount of information and/or content can be presented to users via mobile user equipment devices. Users can find it irritating and frustrating to be inundated with information and/or content not relevant to a user's location and/or personal preferences.

SUMMARY OF THE INVENTION

In view of the foregoing, methods and systems for performing actions based on location-based rules are provided. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified. Based on the location-based rule, the location, and the entertainment profile of the user, the action may be performed.

In some embodiments, the entertainment profile is received from a home entertainment device of the user.

In some embodiments, the entertainment media characteristics define an entertainment media preference of the user.

In some embodiments, determining that the user entered a predetermined range of the location comprises receiving global positioning system (GPS) location data and comparing the GPS location data to GPS location data of the location.

In some embodiments, the location-based rule defines a region of locations.

In some embodiments, the location-based rule defines that the action to be taken is to be performed when the user leaves the location, and the action is related to the location the user left.

In some embodiments, the methods and systems also receive a definition of a location-based rule that is based on an address and a distance from the address.

In some embodiments, the location-based rule defines a time parameter, and the action is performed based on the location-based rule, the location, the entertainment profile of the user, and the time parameter.

In some embodiments, performing the action comprises generating for display, on the mobile device associated with the user, an option for the user pertaining to a media asset corresponding to the location.

In some embodiments, performing the action comprises communicating with a home entertainment device of the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows an example of an XML structure for describing a Geo-Fence in some embodiments of the invention.

FIG. 14 shows an example of an XML structure for defining a rule in some embodiments of the invention.

FIG. 16 shows an example of an XML structure for storing location data in some embodiments of the invention.

DETAILED DESCRIPTION OF EMBODIMENTS

Figure 1:
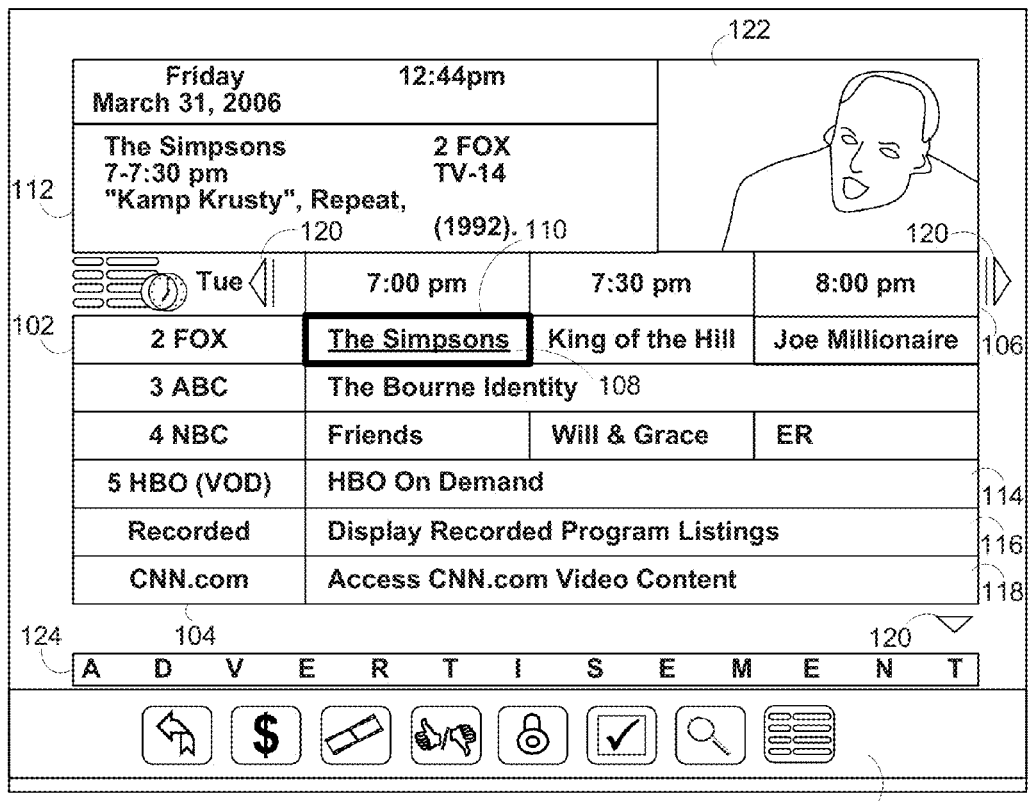
FIGS. 1-2 show various illustrative display screens that may be used to provide media guidance in accordance with some embodiments of the invention.

The invention generally relates to methods and systems for performing actions based on location-based rules. In particular, these methods and systems may store an entertainment profile of a user, wherein the entertainment profile identifies entertainment media characteristics of the user. It may then be determined that the user entered a predetermined range of a location. In response to this, a location-based rule that corresponds to the location and that defines an action to be taken may be automatically identified.

Based on the location-based rule, the location, and the entertainment profile of the user, the action may be performed.

The amount of content available to users in any given content delivery system may be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. The various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
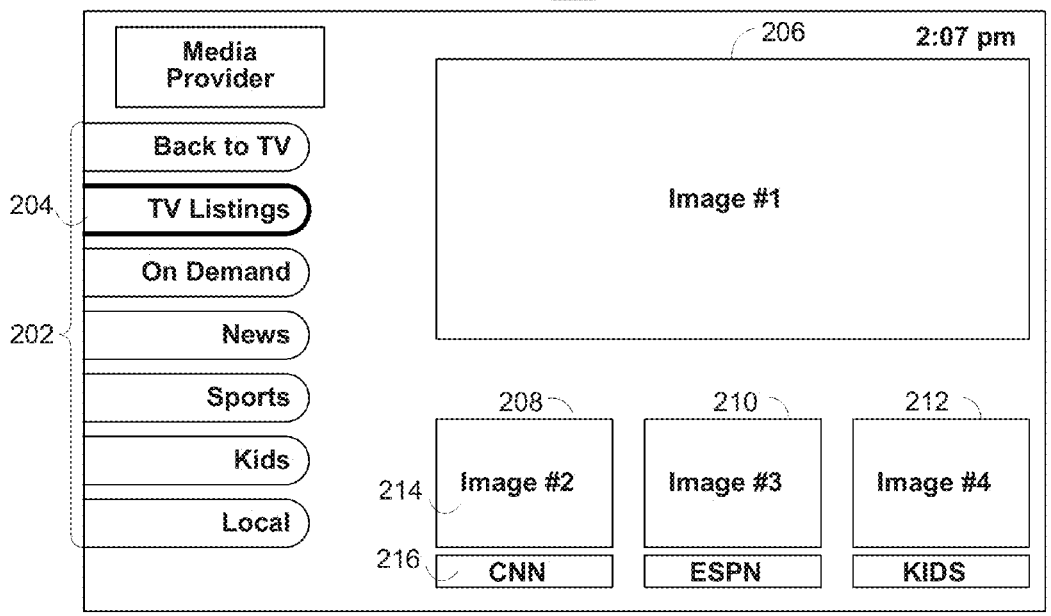

FIGS. 1-2 show illustrative display screens that may be used to provide media guidance data. The display screens shown in FIGS. 1-2 and 7-8 and 10-13 may be implemented on any suitable user equipment device or platform. While the displays of FIGS. 1-2 and 7-8 and 10-13 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or a guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application.

Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
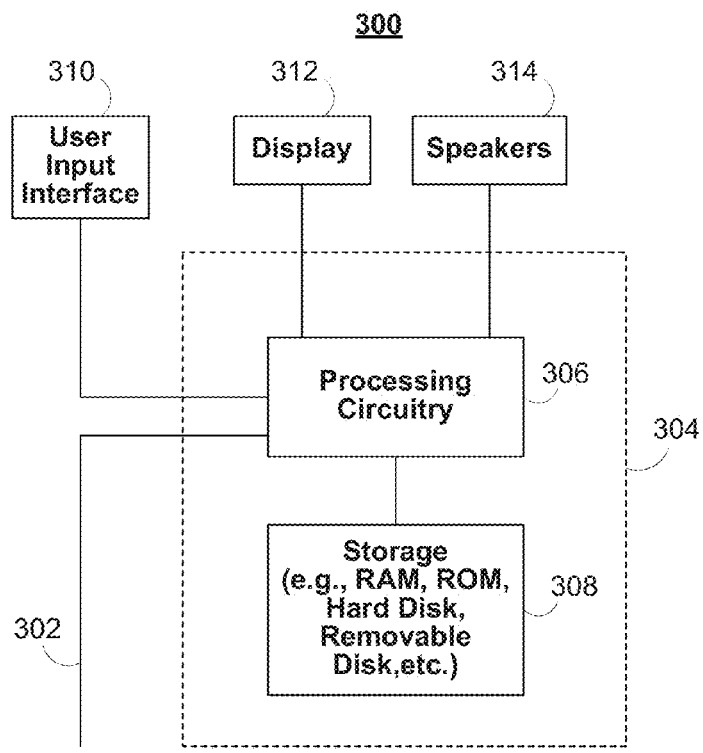
FIGS. 3-4 show generalized embodiments of illustrative user equipment devices, on which a media guidance application may be implemented in accordance with some embodiments of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized hardware processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, gesture recognition, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using any other suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
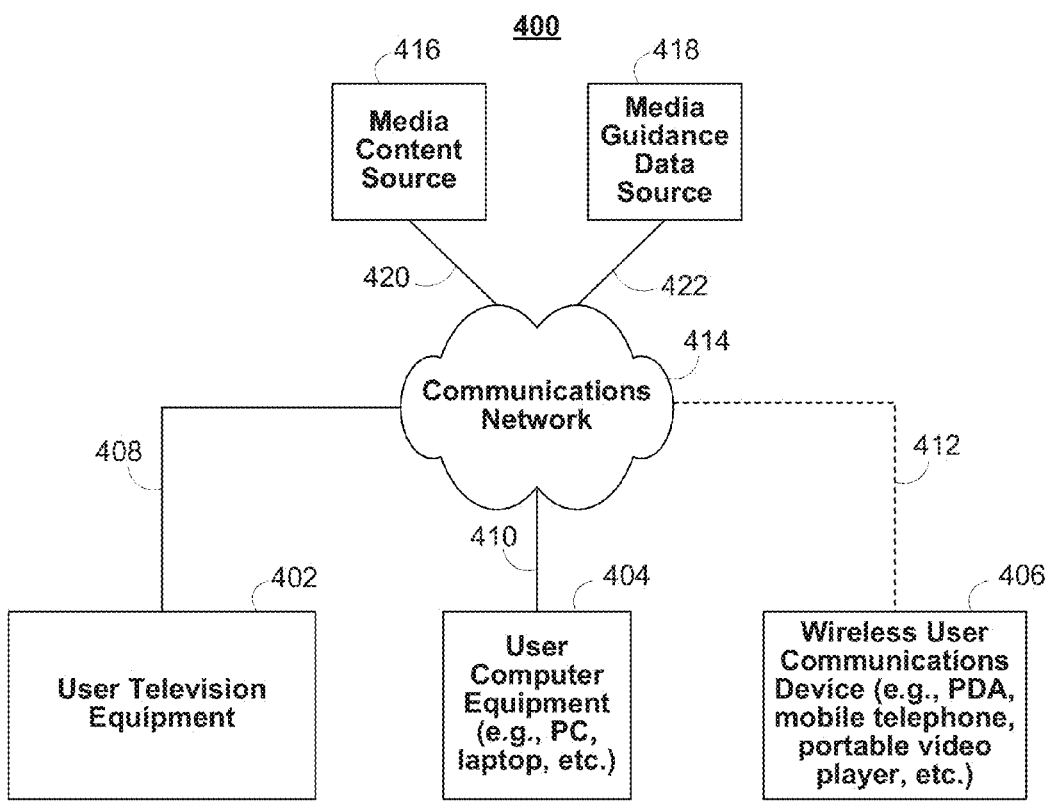

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections.

OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

Figure 5:
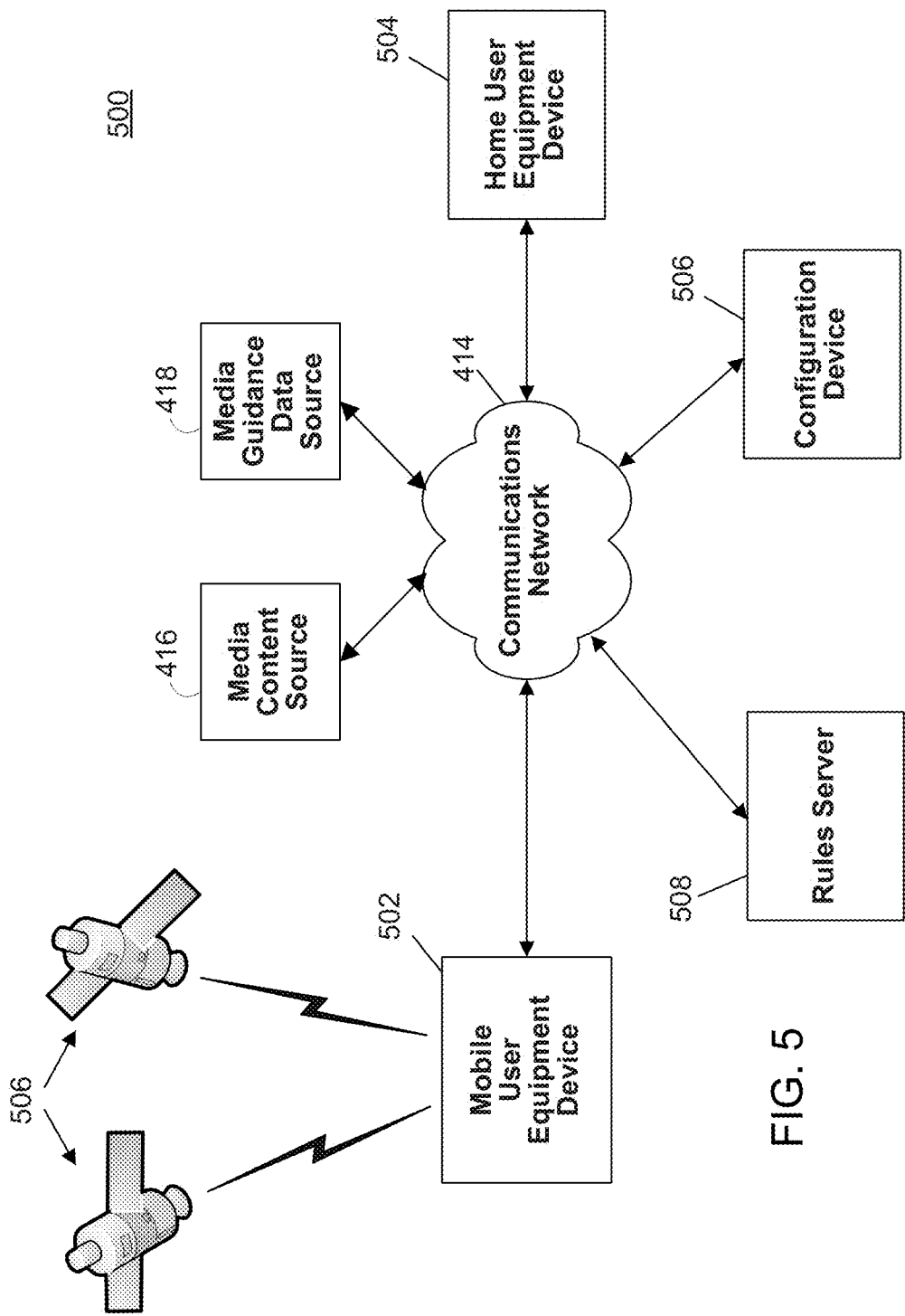
FIG. 5 shows a generalized embodiment of illustrative user equipment devices, on which location-based rules may be implemented in accordance with some embodiments of the invention.

Turning to FIG. 5, an example of a more particular arrangement 500 of some of the components of FIG. 4 that may be implemented in some embodiments is illustrated. As shown, in some embodiments, arrangement 500 may include a mobile user equipment device (MUED) 502, a communication network 414, a media content source 416, a media guidance data source 418, a home user equipment device (HUED) 504, a configuration device 506, and a rules server 508.

MUED 502 may be implemented using any suitable user equipment device in some embodiments. For example, MUED 502 may be implemented using a wireless user communications device 406 (or a device similar to device 406), using a portable variation of user television equipment 402 or user computer equipment 404, etc. In some embodiments, MUED 502 may receive signals from any suitable mechanisms (e.g., such as global positioning system satellites 506, mobile telephone towers, wireless network transceivers, etc.) that facilitate the device determining its location (e.g., using triangulation).

Communication network 414, media content source 416, and media guidance data source 418 may be as described above in connection with FIG. 4.

HUED 504 may be implemented using any suitable device or devices, such as user television equipment 402, user computer equipment 404, and wireless user communications device 406, in some embodiments.

Configuration device 506 can be implemented using any suitable device or devices in some embodiments. For example, configuration device 506 can be implemented using user computer equipment 404 in some embodiments.

Rules server 508 can be implemented using any suitable server, database, or other device capable of performing the functions of rules server 508 as described herein.

Although only a single MUED, a single HUED, a single configuration device, and a single rules server are illustrated in FIG. 5, any suitable number of MUEDs, HUEDs, configuration devices, and/or rules servers may be provided in any suitable application in some embodiments. For example, a MUED may be provided for each person in a household. As another example, multiple HUED's may be located in different portions of a home. As yet another example, each of multiple configuration devices may be provided for different users of those devices (as described below). As still another example, a different rules server may be provided for different geographical areas.

While the terms home, house, household, home user equipment device, etc. are used herein for simplicity and clarity, these terms may apply to any suitable locations including homes and non-homes. For example, one or more HUEDs may be located in a restaurant or a bar, a store, an office, and/or any other suitable location in some embodiments.

In some embodiments, various actions may be taken based on a location of MUED 502 and/or based on a change in location of the MUED. For example, in some embodiments, actions can be taken based on a MUED 502 being within or outside a defined area, or passing into or out of the defined area. Such a defined area may be referred to as being within a "Geo-Fence" in some embodiments. As referred to herein actions the can be taken may include causing the MUED or HUED to display a prompt indicating the entry or exit of the defined area, manually or automatically scheduling a media guidance function (e.g., scheduling a recording, setting a reminder, ordering or purchasing a program) related to content associated with the defined area, transmitting a communication to another user equipment device with instructions to perform a media guidance function related to content associated with the defined area, or any combination thereof.

Figure 6A:
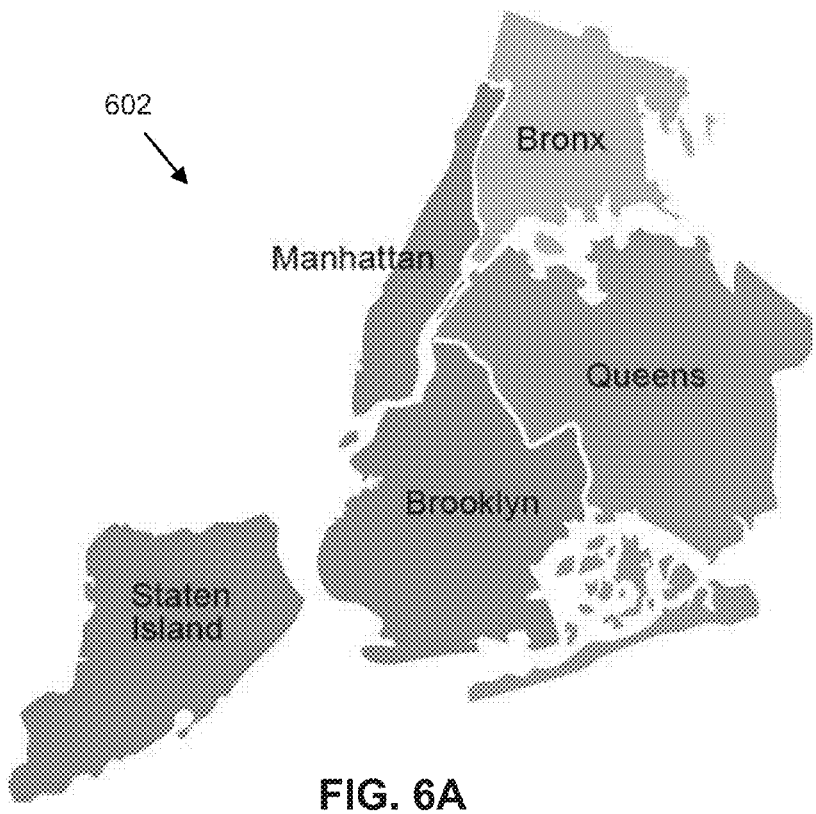
FIGS. 6A and 6B show examples of different types of geo-fenced areas in some embodiments of the invention.
Figure 6B:

Turning to FIGS. 6A and 6B, two examples of Geo-Fences are illustrated. As shown in FIG. 6A, a Geo-Fence 602 can be set up based on one or more city borders such as the borders of New York, N.Y.. As demonstrated by this example, in some embodiments, a Geo-Fence can include multiple sub-areas that need not be connected to other areas. As shown in FIG. 6B, a Geo-Fence 604 can also be set up for a much smaller area and have only a simple border (e.g., in this case, a circular border).

Although two particular examples of Geo-Fences that can be used in accordance with some embodiments are illustrated in FIGS. 6A and 6B, any suitable number of Geo-Fences, and any suitably shaped Geo-Fences, can be used in some embodiments.

Figure 7:
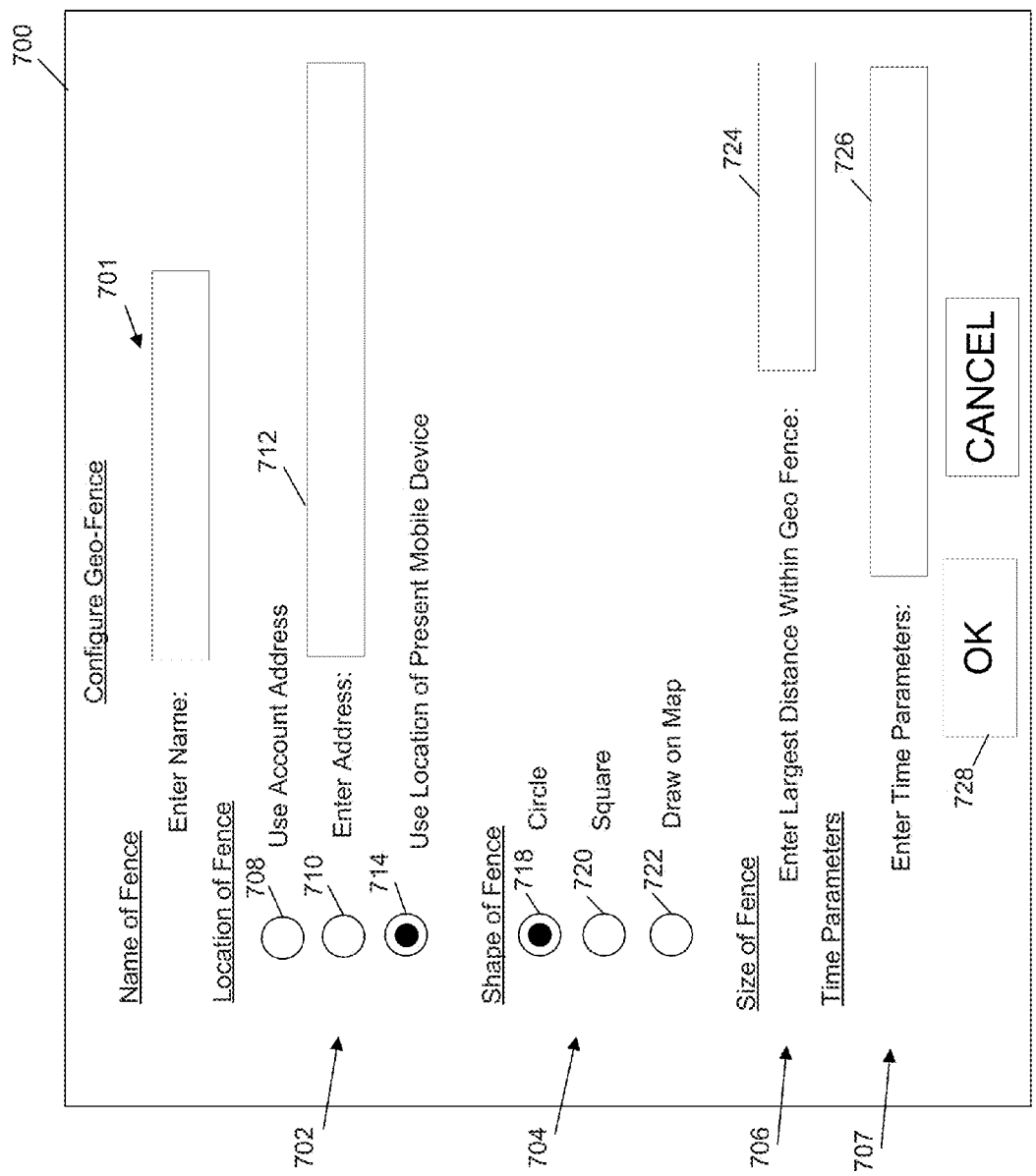
FIGS. 7-8 show examples of user interfaces for configuring a Geo-Fence in some embodiments of the invention.
Figure 8:
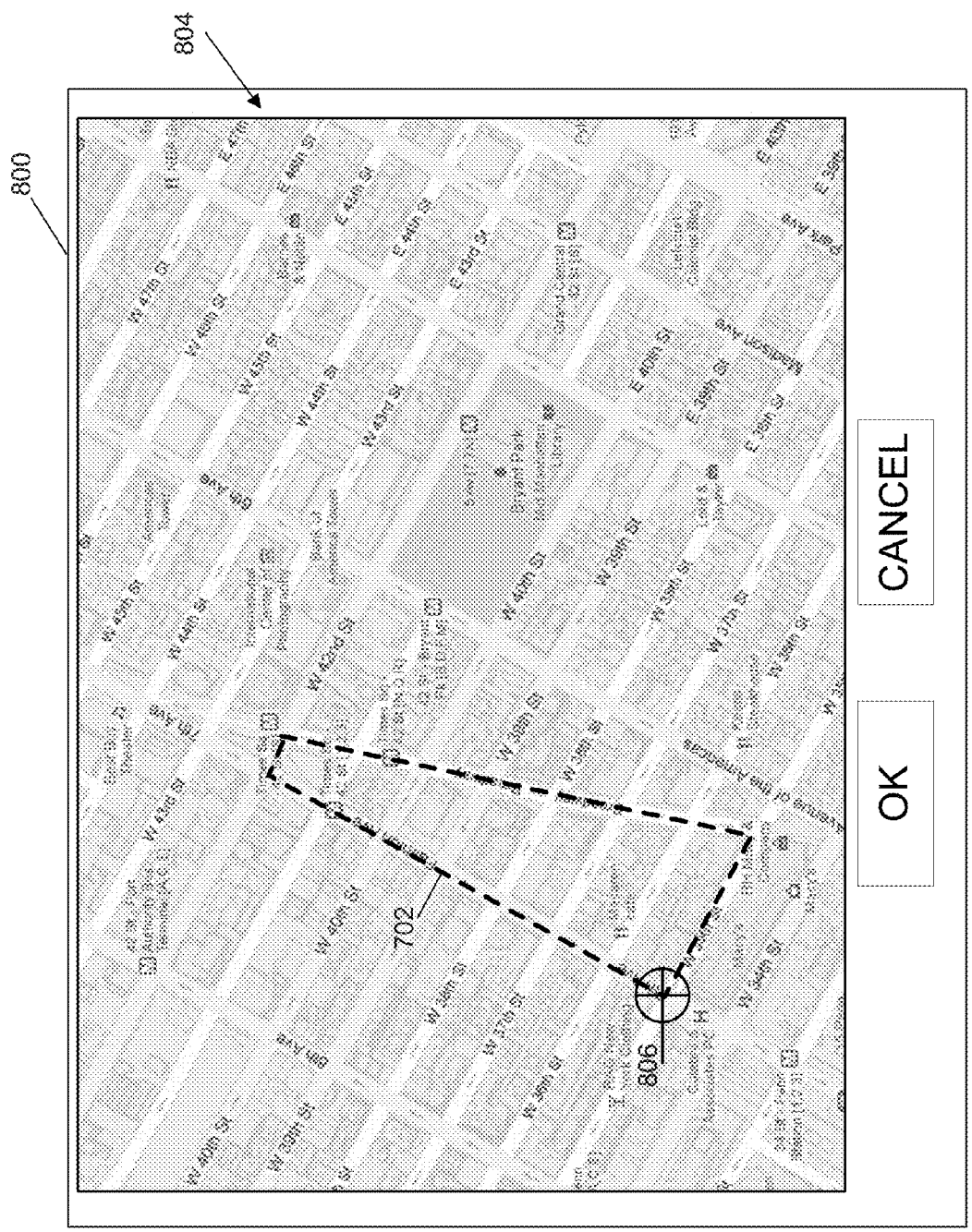

FIGS. 7 and 8 show examples of user interfaces 700 and 800, respectively, that may be presented by control circuitry 304 of configuration device 506 to define a Geo-Fence in some embodiments. As illustrated, a user may specify a name for a Geo-Fence in field 701, a location of the Geo-Fence (e.g., the center of a Geo-Fenced area) using region 702, a shape of the Geo-Fence using region 704, a size of the Geo-Fence using region 706, and time parameters in region 707.

More particularly, in response to receiving user entry of a name in field 701 (e.g., using a user input interface of the HUED), control circuitry 304 may assign a name to the Geo-Fence.

In response to receiving a selection of one of radio buttons 708, 710, and 714, the configuration device's control circuitry may configure the location of the Geo-Fence based on account address of a user (e.g., based on a log-in identification), based on an address entered by the user in field 712, or based on the present location of a mobile device currently being used to access interface 700, respectively. Any other method for determining the location of the Geo-Fence may additionally or alternatively be used in some embodiments.

In response to receiving a selection of one of radio buttons 718, 720, and 722, control circuitry 304 can define the shape of the Geo-Fence as being a circle around the location of the fence, a square around the location of the fence, or a shape to be drawn on a map by the user (as described further below), respectively. Any other suitable shape(s) and any other suitable mechanism for defining the shape may additionally or alternatively be used in some embodiments.

In field 724 of region 706, control circuitry 304 can receive a user's specification of the largest distance within the Geo- Fence. For example, if the Geo-Fence is specified in region 704 as being a circle, the user may specify in field 724 the diameter of the circle. As another example, if the Geo Fence is specified in region 704 as being a square, the user may specify in field 724 a diagonal distance between two opposite corners of the square. As yet another example, if the Geo Fence is specified in region 704 as to be drawn on a map, the user may specify the approximate scale of the Geo Fence in field 724 so that an appropriately sized map can be presented for drawing the Geo Fence. Any suitable distance can be specified in field 724 and the distance can be specified in any suitable units of measure. For example, in some embodiments, the distance can be 50 feet, 5 miles, two city blocks, 2 kilometers, etc. Any other suitable mechanism for specifying a size associate with the Geo-Fence may additionally or alternatively be used in some embodiments.

In field 726 of region 707, control circuitry 304 can receive a user's specification of time parameters for the Geo-Fence. Any suitable time parameters can be used in some embodiments. For example, the Geo-Fence can be specified as always being active, as being active on certain weeks and days, as being active during certain hours, as starting on a certain date, as lasting a certain duration of time, as expiring on a certain date, as never being active, etc.

An example of such a map 804 for drawing a Geo-Fence 802 is illustrated in interface 800 of FIG. 8. This map may be presented by control circuitry 304 of the configuration device upon it receiving a user selection of an OK button 728 after radio button 722 has been selected. Control circuitry 304 may initially display the map based on the location specified in region 702 and the size specified in region 706. Control circuitry 304 may then receive a user drawing of the Geo-Fence in response to: (i) the user moving a cross-hairs icon 806 to a first point on the map using arrow buttons on a user input interface 310; (ii) the user creating a corner of the fence using a single depression of an ENTER button on interface 310; (iii) the user moving icon 806 to a next corner location using the arrow buttons and creating the next corner and a fence portion between the next corner and the previous corner using the ENTER button; (iv) the user repeating (iii) any suitable number of times; and (v) the user creating a fence portion connecting the last corner back to the first corner using a double depression of an ENTER button on interface 310.

Referring back to FIGS. 6A and 7, an interface, such as interface 700 of FIG. 7, may be used to set up Geo-Fence for New York, N.Y. (shown in FIG. 6A) by selecting radio button 710, specifying an address of "New York, N.Y." in field 712, selecting radio button 722, entering the approximate distance across New York, N.Y. in field 724, selecting any desired time parameters in field 726, and outlining the various portions of New York, N.Y. shown in FIG. 6A using an interface 800 as shown in FIG. 8.

Referring back to FIGS. 6B and 7, an interface, such as interface 700 of FIG. 7, may be used to set up Geo-Fence for the circular region of Manhattan (shown in FIG. 6B) by selecting radio button 710, specifying an address at the center of the area (e.g., "525 Broome Street, New York, N.Y.") in field 712, selecting radio button 718, entering the diameter of the area (e.g., 1 mile) in field 724, and selecting any desired time parameters in field 726.

Although the process of setting up a Geo-Fence is described herein as including time parameters, in some embodiments, the time parameters may be omitted.

In some embodiments, any suitable numbers (including none) of Geo-Fences may be set up.

Once set up, each Geo-Fence can be saved to storage 308 of a HUED and/or MUED, to media guidance data source 418, to configuration device 506, to rules server 508, and/or to any other suitable location. The Geo-Fence may be stored in any suitable manner, such as using an XML structure as illustrated in FIG. 9, in some embodiments.

In some embodiments, advertising related content can be presented to a user based on a MUED's location or movement relative to one or more Geo-Fences. More particularly, for example, such advertising related content can include an offer presented on the MUED, an alert presented on the MUED, an advertisement presented on a HUED, and/or any other suitable advertising related content.

In some embodiments, the presentation of this advertising related content can be controlled using one or more rules. For example, such rules may specify one or more conditions that must be met before a corresponding action, such as presenting the advertising related content, can be triggered.

For example, in some embodiments, an operator of a movie theatre may want to advertise a movie showing using a discount offer on tickets to people who are fans of the movie and who are in the area of the theatre shortly before the movie is to be presented. As a more particular example, such a movie could be a HARRY POTTER movie (e.g., "HARRY POTTER AND THE DEATHLY HALLOWS PT 1"), the discount offer could be 15% off of two tickets for the 7 pm showing at the AMC Theatre, and this offer could be presented to anyone who is a HARRY POTTER fan and who is within a half mile of the theatre 30 minutes before the show time.

In such a case, a Geo-Fence can be established one half mile around the theatre, and a rule can be established that specifies that when a MUED is within the Geo-Fence 30 minutes before a show time, and the user of the MUED is a HARRY POTTER fan, an offer for 15Ø off of the purchase of two tickets for the 7 pm showing at the AMC Theatre will be presented on the MUED.

Figure 10:
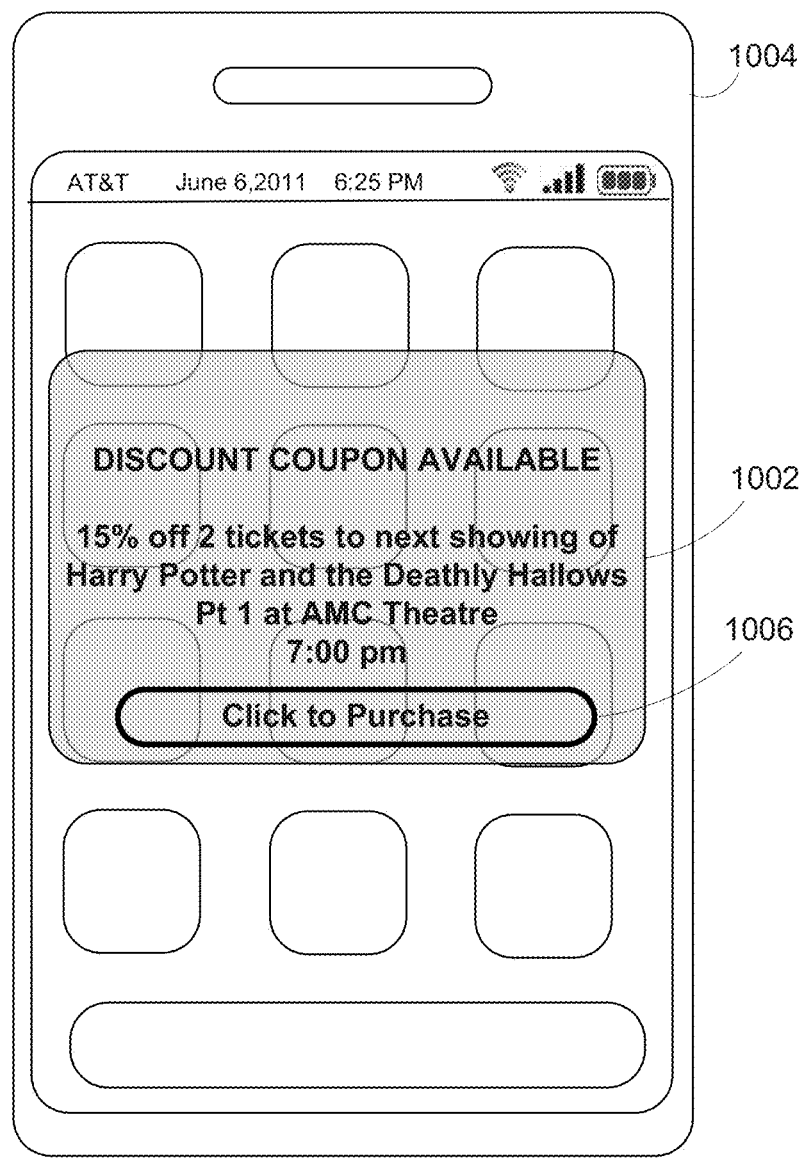
FIGS. 10-11 show various illustrative display screens that may be used to present advertising related content on mobile user equipment devices in some embodiments of the invention.

An example of the presentation of such an offer is shown in FIG. 10. As illustrated, an offer 1002 may be presented by control circuitry 304 of a MUED 1004. As also shown, if a user of the MUED is interested in accepting the offer, the user can select CLICK-TO-PURCHASE button 1006 to cause the control circuitry to electronically purchase the tickets from the theatre.

As another example, in some embodiments, a movie-delivery or video-on-demand service (e.g., such as NETFLIX) may wish to promote use of its service by recommending movies for viewing that are related to new-release movies that its subscribers have just seen in particular theatres. As a more particular example, such a new release could be "THE EXPENDIBLES" starring Sylvester Stallone, the relate movies could be the movies in the "RAMBO TRILOGY" (in which Sylvester Stallone also starred), and the recommendation could be to add these related movies to the subscribers' movie queue.

In such a case, a Geo-Fence can be established around one or more movie theatres at which the movie "THE EXPENIDBLES" is playing, and a rule can be established that specifies that when a MUED exits the Geo-Fence area around the time that "THE EXPENDIBLES" finishes, perform an action (e.g., present on the MUED an offer to add the RAMBO TRILOGY to the services queue). In some implementations, the rule may be established that causes the action to be performed when the MUED exits the Geo-Fence area after being within the Geo-Fence area for a predetermined period of time (e.g., 20 minutes). This may avoid inadvertently performing an action that may not be relevant to the user's situation.

Figure 11:
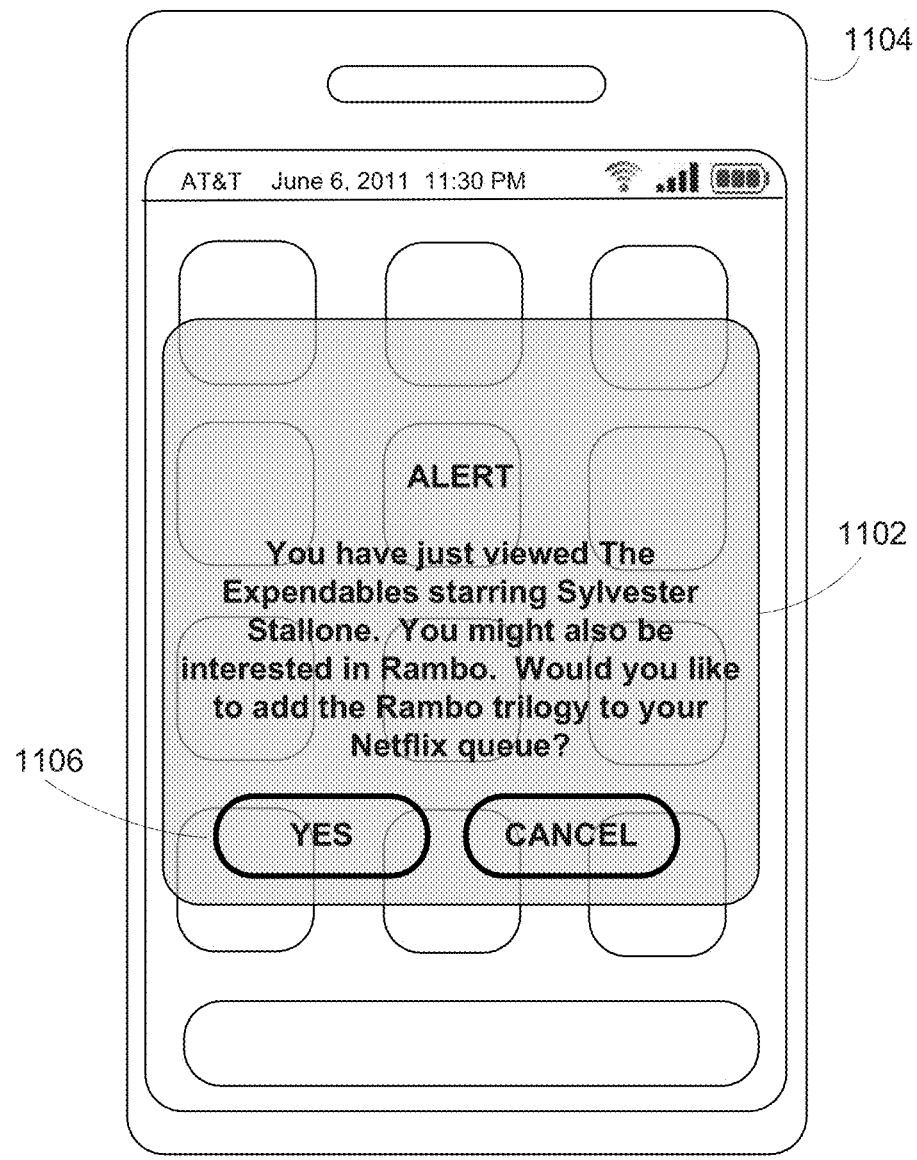

An example of the presentation of such an offer is shown in FIG. 11. As illustrated, an offer 1102 may be presented by control circuitry 304 of a MUED 1104. As also shown, if a user of the MUED is interested in accepting the offer, the user can select YES button 1106 to cause the control circuitry to cause the RAMBO TRILOGY movies to be added to the service's queue.

Figure 12:
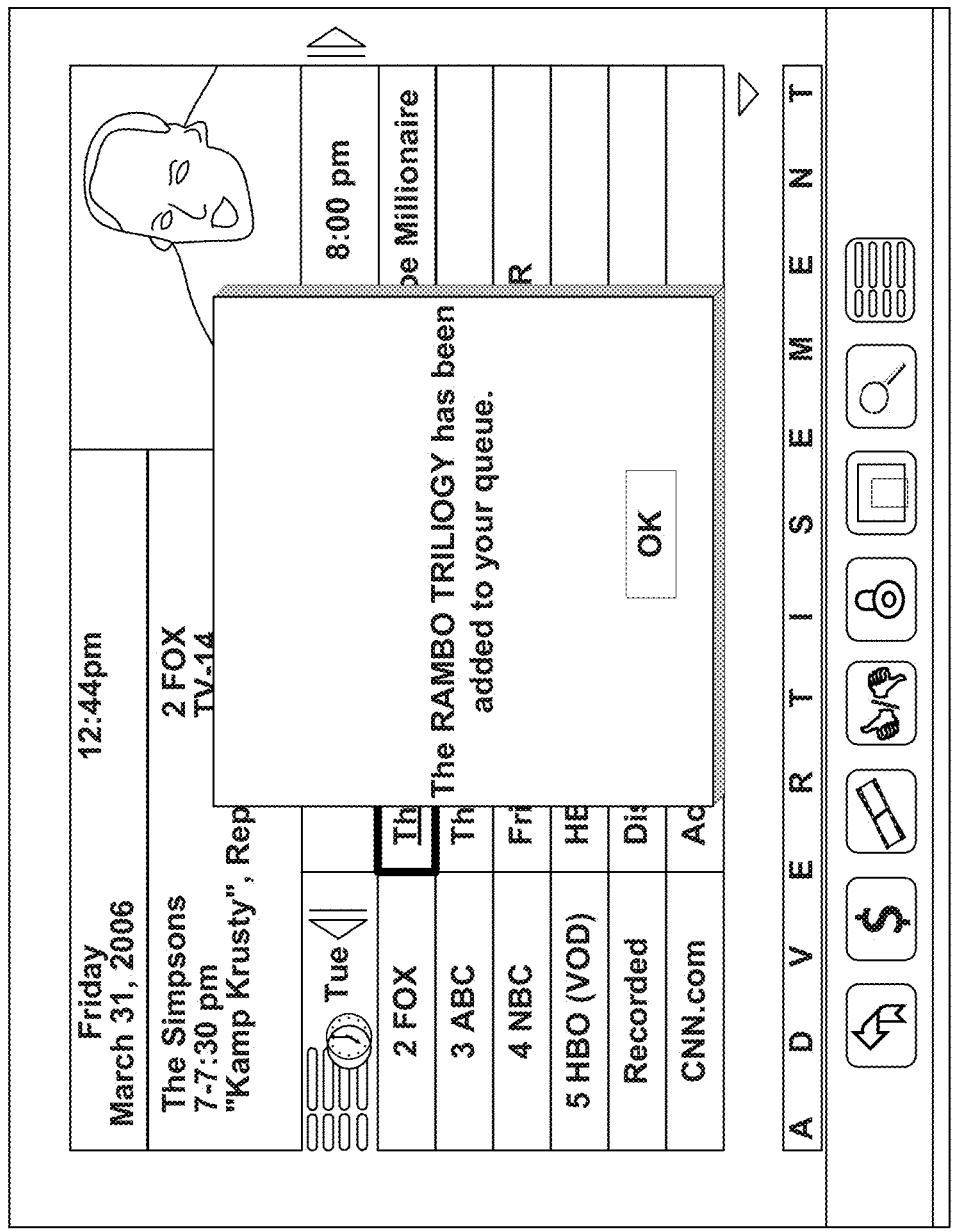
FIG. 12 shows an illustrative display screen that may be used to present advertising related content on a home user equipment device in some embodiments of the invention.

In some embodiments, these rules can additionally or alternatively cause advertising related content and/or any other suitable content to be presented on a HUED of the user of the MUED. For example, as shown in FIG. 12, after accepting an offer (e.g., as presented in FIG. 11), a message may be presented in a media guidance application on the HUED indicating that the RAMBO TRILOGY has been added to the user's queue.

The definitions of these and other examples of rules may be summarized as having a condition and one or more actions for a MUED and/or a HUED as follows:

| Rule | Condition | MUED Action | HUED Action |
| --- | --- | --- | --- |
| 1 | (1) MUED is within "Geo-Fence 1" 30 minutes before a show time, AND (2) the user of the MUED is a HARRY POTTER fan | an offer for 15% off of the purchase of two tickets for the 7 pm showing at the AMC Theatre will be presented on the MUED | No action |
| 2 | MUED just exited "Geo-Fence 2" Rule Condition around the time that "THE EXPENDIBLES" finishes | An offer to add the RAMBO TRILOGY to the services queue will be presented on the MUED | Present confirmation HUED Action that movies have been added to queue |
| 3 | MUED just exited "Geo-Fence 2" around the time that "THE EXPENDIBLES" finishes and MUED was located within "Geo-Fence 2" for a predetermined period of time | An offer to add the RAMBO TRILOGY to the services queue will be presented on the MUED | Present confirmation that movies have been added to queue |

If the conditions are met, then the actions for the rule may be performed.

Although the rules illustrated above include time components (e.g., 30 minutes before show time), in some embodiments these time components can instead be implemented using the time parameters of a Geo-Fence. For example, in rule 1, the time component could be removed, and the definition of Geo-Fence 1 could be modified to specify that it is only active 30 minutes before show time.

Although particular examples of rules are shown, any suitable rules and any suitable numbers of rules may be used in some embodiments.

In some embodiments, the presentation of such advertising related content can be configured by advertisers (e.g., such as retail businesses, advertising agencies, business service providers, etc.) using configuration device 506.

Figure 13:
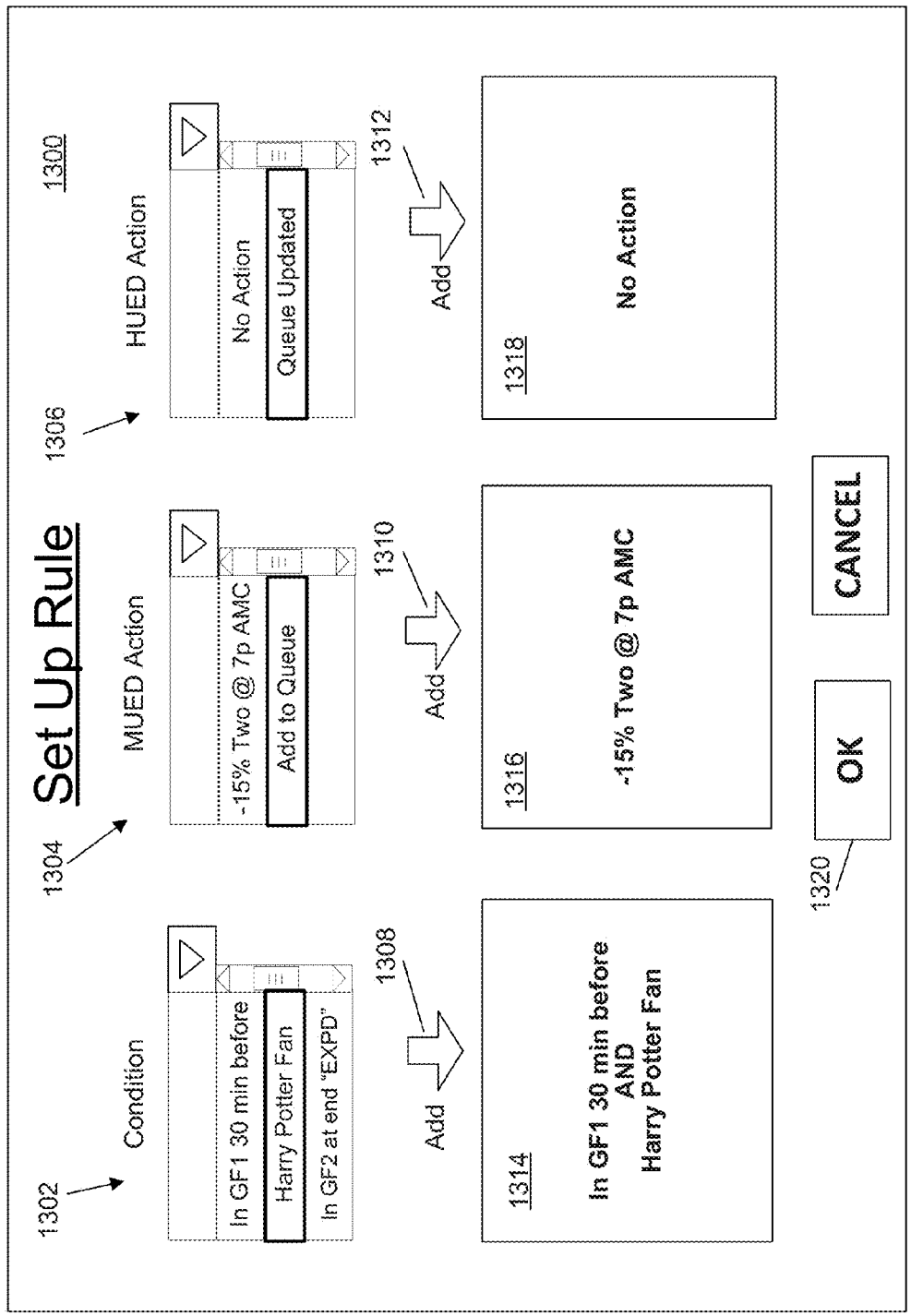
FIG. 13 shows an example of a user interface for configuring a rule in some embodiments of the invention.

Turning to FIG. 13, an example of a user interface 1300 that may be presented by control circuitry 304 of configuration device 506 to set up a rule in accordance with some embodiments is shown. As illustrated, to set up a rule, the control circuitry may receive from a user a selection of a condition from menu 1302. Any suitable condition options may be provided and any suitable number of conditions may be available. Upon receiving a condition selection and a selection of an ADD icon 1308, the condition may be added by the control circuitry to space 1314. Upon a second (or further) selection of a condition and a selection of ADD icon 1308, one or more additional conditions can be added to space 1314 for the rule.

Next, the control circuitry can receive a selection of an action (if any) to be performed at a MUED when the conditions are met. Similarly to the selection of a condition, an action at the MUED can be selected using menu 1304 and icon 1310 so that one or more actions are listed in space 1316. Any suitable actions, any suitable number of actions, and any suitable order of actions can be specified for the MUED in some embodiments.

The control circuitry can then receive a selection of an action (if any) to be performed at a HUED when the conditions are met. Similarly to the selection of a condition, an action at the HUED can be selected using menu 1306 and icon 1312 so that one or more actions are listed in space 1318. Any suitable actions, any suitable number of actions, and any suitable order of actions can be specified for the MUED in some embodiments.

Finally, when a user is done adding a rule, the user can select an OK button 1320 and in response thereto the control circuitry may save the rule in an XML structure such as that illustrated in FIG. 14 in some embodiments.

In some embodiments, in order to facilitate the processing of such rules on the Geo-Fences and the presentation of such advertising related content, one or more processes may be performed in MUED 502, rules server 508, and/or HUED 504. Any suitable processes may be used in some embodiments.

Figure 15:
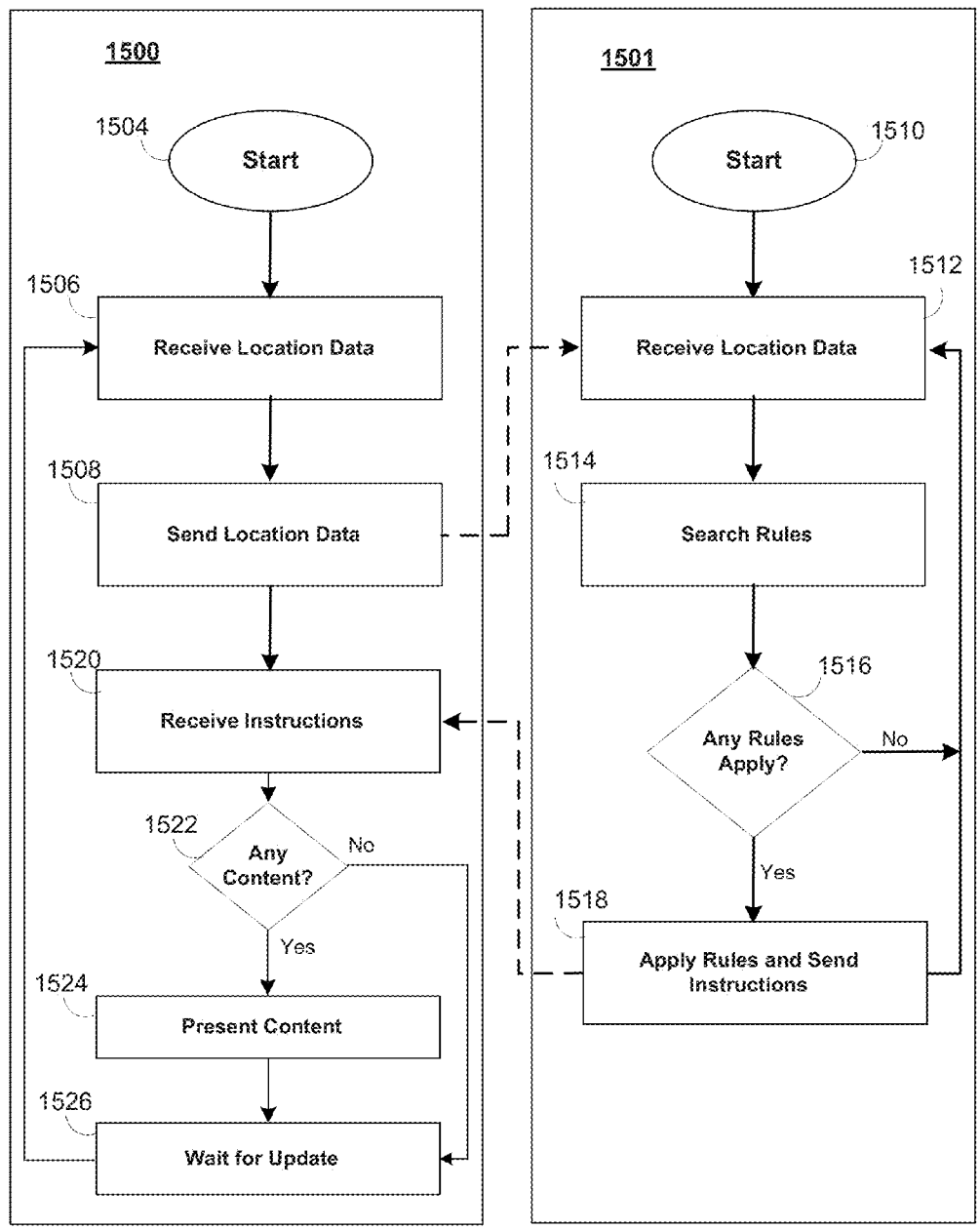
FIG. 15 is a diagram of processes for a mobile device and a rules server in some embodiments of the invention.

For example, in accordance with some embodiments, control circuitry 304 of a MUED 502 and rules server 508 may implement processes such as process 1500 and process 1501, respectively, of FIG. 15.

As shown, after process 1500 begins at 1504, control circuitry 304 of MUED 502 can receive location data at 1506. This location data can be received from any suitable source. For example, this location data can be received from global positioning system circuitry in MUED 502.

In some embodiments, MUED 502 or HUED 504 may include position information circuitry, such as Global Positioning System (GPS) circuitry, location-based services (LBS) circuitry, triangulation circuitry, hybrid positioning systems circuitry, or any other suitable position obtaining circuits or combinations of such circuits. MUED 502 or HUED 504 may use the position information obtained from the position information circuitry to determine the current position or location of MUED 502 or HUED 504. In some implementations, MUED 502 or HUED 504 may obtain the current position or location of MUED 502 or HUED 504 by accessing a social network, such as over the Internet. For example, MUED 502 or HUED 504 may monitor a status update posted to the social network for the user. MUED 502 or HUED 504 may parse the status update for information that identifies a current location of the user (e.g., name of a venue or event the user is attending). In some implementations, MUED 502 or HUED 504 may monitor a status update of a friend of the user on the social network. In particular, MUED 502 or HUED 504 may parse the status update of the friend of the user for information that identifies a particular location or event and the name of the user. In some implementations, MUED 502 or HUED 504 may obtain the current position of MUED 502 or HUED 504 by accessing a calendar associated with the user. In some implementations, MUED 502 or HUED 504 may determine the location of MUED 502 or HUED 504 when the user checks into a location using an application on MUED 502 or HUED 504, such as FACE-BOOK. The application on MUED 502 or HUED 504 may present to the user a list of locations or venues within a predetermined range of the user. The user may select one of the locations or venues in the list to check in and as a result specify to MUED 502 or HUED 504 the location or venue of MUED 502 or HUED 504. This location or venue can be used as the location data received at 1506.

Next, at 1508, the location data can be sent by the control circuitry to the rules server. This data can be sent in any suitable manner. For example, in some embodiments, this data can be sent in an XML structure as illustrated for example in FIG. 16. As shown in FIG. 16, this location data can include an identifier of the MUED, an identifier of the user of the MUED, a latitude value, and a longitude value in some embodiments. Any other suitable data can additionally or alternatively be included.

After process 1501 begins at 1510, this location data may then be received at 1512 by a hardware processor of the rules server.

Next, at 1514, the hardware processor of the rules server can search for rules relating to the location of the MUED. This can be performed in any suitable manner. For example, in some embodiments, the hardware processor can submit a query to a database in its storage containing rules and Geo-Fence definitions in the XML structures illustrated in FIGS. 14 and 9, respectively.

The hardware processor of the rules server can then determine if any rules apply at 1516, and if not loop back to 1512 to wait for the next receipt of location data. Otherwise, the hardware processor can proceed to 1518.

At 1518, any applicable rules can be applied by checking the conditions of the rules and performing any actions specified therein when the conditions are met.

For example, for rule 1 above, at 1518, the hardware processor can determine whether, based on the location data received in 1512, the MUED is within "Geo-Fence 1" 30 minutes before a show time, and whether the user of the MUED is a HARRY POTTER fan. If both of these conditions are met, then the hardware processor can send instructions to the MUED to present an offer for 15% off of the purchase of two tickets for the 7 pm showing at the AMC Theatre.

As another example, for rule 2 above, at 1518, the hardware processor can determine whether, based on the location data received in 1512, the MUED has just exited "Geo-Fence 2" around the time that "THE EXPENDIBLES" finishes. If this condition has been met, then the hardware processor can send instructions to the MUED to present an offer to add the RAMBO TRILOGY to the services queue, and can send instructions to the HUED to present a message in a media guidance application indicating that the RAMBO TRILOGY has been added to the user's queue if and when this is done.

As another example, for rule 3 above, at 1518, the hardware processor can determine whether, based on the location data received in 1512, the MUED has just exited "Geo-Fence 2" around the time that "THE EXPENDIBLES" finishes after being located within "Geo-Fence 2" for a predetermined time period (e.g., 20 minutes). If this condition has been met, then the hardware processor can send instructions to the MUED to present an offer to add the RAMBO TRILOGY to the services queue, and can send instructions to the HUED to present a message in a media guidance application indicating that the RAMBO TRILOGY has been added to the user's queue if and when this is done.

In some embodiments, certain settings data relating to a user's program favorites, programming preferences, favorite artists, etc. (which can be referred to as entertainment media characteristics) can be stored in an entertainment media profile for the user. The rules server may access such entertainment media characteristics (from the entertainment media profile) and any other suitable content, guidance data, preferences, profiles, settings, etc. in checking the conditions of the rules and performing any actions specified therein when the conditions are met. The content, guidance data, preferences, profiles, settings, etc. can be accessed from any suitably location (such as MUED 502, media guidance data source 418, and/or HUED 502) by the rules server. For example, in some embodiments, the rules server may access guidance data from media guidance data source 418.

In the event that no content is to be presented on the MUED, instructions indicating that condition can be sent to the MUED at 1518 in some embodiments.

The instructions sent to the MUED at 1518 can next be received at 1520 and then the control circuitry of the MUED can determine at 1522 if there is any content to be presented. If not, then process 1500 can branch to 1526 to wait for an update period (which can be any suitable duration including none) and then loop back to 1506. Otherwise, the hardware processor can present the content specified in the instructions at 1524. For example, as described above, for rule 1, this content may be presented as illustrated in FIG. 10. As another example, as described above, for rule 2, this content may be presented as illustrated in FIG. 11.

Although not illustrated in FIG. 15, a similar process may be performed in the HUED in which the instructions sent at 1518 may be received, a check may be made to determine if content is to be presented, and if so the content may be presented in accordance with the instructions. For example, as described above, for rule 2, such content on the HUED may be presented as illustrated in FIG. 12.

After content has been presented at 1524, the control circuitry can then continue to 1526 to wait for an update period (which can be any suitable duration including none) and then loop back to 1506.

Although only a single instance of process 1501 and a single instance of process 1502 are illustrated in FIG. 15, any suitable number of each of these processes may be implemented in some embodiments. For example, multiple instances of process 1501 may be implemented on a MUED 502. As another example, multiple instances of a process 1502 may be implemented on a rules server 508.

It should be understood that some of the above steps of the flow diagram of FIG. 15 may be executed or performed in an order or sequence other than the order and sequence shown and described in the figure. Also, some of the above steps of the flow diagram of FIG. 15 may be executed or performed substantially simultaneously where appropriate or in parallel to reduce latency and processing times.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, BLU-RAY discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A method for performing actions based on location-based rules, the method comprising:
    storing an entertainment profile of a user, wherein the entertainment profile identifies entertainment media characteristics of the user;
    determining that the user entered a predetermined range of a location;
    in response to the determining, automatically identifying a location-based rule that corresponds to the location;
    selecting one of a plurality of actions based on the location and the location-based rule; and
    in response to the determining that the user entered the predetermined range of the location, generating for display, on a user equipment device associated with the user, an interactive option corresponding to the selected action, wherein a media asset function that corresponds to the location is performed responsive to receiving a user selection of the option.

2. The method of claim 1, further comprising receiving the entertainment profile from a home entertainment device of the user.

3. The method of claim 1, wherein the entertainment media characteristics define an entertainment media preference of the user.

4. The method of claim 1, wherein determining that the user entered a predetermined range of the location comprises receiving global positioning system (GPS) location data and comparing the GPS location data to GPS location data of the location.

5. The method of claim 1, wherein the location-based rule defines a region of locations.

6. The method of claim 1, wherein the location-based rule defines another action to be performed when the user leaves the location, and wherein the another action is related to the location the user left.

7. The method of claim 1, further comprising receiving a definition of a location-based rule that is based on an address and a distance from the address.

8. The method of claim 1, wherein:
    the location-based rule defines a time parameter; and
    the action is selected based on the time parameter.

9. The method of claim 1, further comprising communicating with a home entertainment device of the user responsive to receiving the user selection of the option.

10. A system for performing actions based on location-based rules, the system comprising:
    a storage device; and
    processing circuitry configured to:
        store an entertainment profile of a user on the storage device, wherein the entertainment profile identifies entertainment media characteristics of the user;
        determine that the user entered a predetermined range of a location;
        in response to the determining, automatically identity a location-based rule that corresponds to the location;
        select one of a plurality of actions based on the location and the location-based rule; and
        in response to the determining that the user entered the predetermined range of the location, generate for display, on a user equipment device associated with the user, an interactive option corresponding to the selected action, wherein a media asset function that corresponds to the location is performed responsive to receiving a user selection of the option.

11. The system of claim 1, wherein the processing circuitry is further configured to receive the entertainment profile from a home entertainment device of the user.

12. The system of claim 1, wherein the entertainment media characteristics define an entertainment media preference of the user.

13. The system of claim 1, wherein processing circuitry, in determining that the user entered a predetermined range of the location, receives global positioning system (GPS) location data and compares the GPS location data to GPS location data of the location.

14. The system of claim 1, wherein the location-based rule defines a region of locations.

15. The system of claim 1, wherein the location-based rule defines another action to be performed when the user leaves the location, and wherein the another action is related to the location the user left.

16. The system of claim 1, wherein the processing circuitry is further configured to receive a definition of a location-based rule that is based on an address and a distance from the address.

17. The system of claim 1, wherein:
    the location-based rule defines a time parameter; and
    the action is selected based on the time parameter.

18. The system of claim 1, wherein the processing circuitry communicates with a home entertainment device of the user responsive to receiving the user selection of the option.

19. The method of claim 1, wherein the media asset function includes placing an order for the media asset.

20. The method of claim 1 further comprising:
    comparing a current time with another time that is associated with the media asset at the location; and
    causing the interactive option to be displayed on the user equipment device in response to determining that 1) the current time corresponds to the another time and 2) the user is within the predetermined range of the location at the current time.

21. The method of claim 20, wherein the location corresponds to a venue featuring the media asset, wherein the another time corresponds to a start time of the media asset at the venue, and wherein the option includes a discount for consuming the media asset at the venue.

22. The method of claim 1 further comprising receiving user input defining at least one of the predetermined range of the location and the location-based rule.

23. The method of claim 1 further comprising:
    detecting that the user has left the predetermined range of the location after having entered the predetermined range of the location; and
    causing the interactive option to be displayed on the user equipment device in response to detecting the that the user has left the predetermined range of the location.

24. The method of claim 23 further comprising:
    measuring an amount of time representing how long the user remained within the predetermined range of the location before leaving the predetermined range of the location, wherein the interactive option is caused to be displayed further in response to determining that the amount of time exceeds a threshold.

25. The method of claim 23, wherein the interactive option corresponds to purchase of the media asset that is related to another media asset corresponding to the location from which the user has left the predetermined range, and wherein the location corresponds to a venue featuring the another media asset that the user has consumed at the location.

26. The method of claim 1, wherein performance of the media asset function includes transmitting an identifier of the media asset to a content source from which the media asset is accessible to the user in response to receiving a user selection of the option.

27. The method of claim 1, wherein determining that the user has entered the predetermined range of the location comprises processing information received over the Internet from another user that identifies the user and a second location corresponding to the user.

28. The method of claim 1, wherein the option is generated for display temporally with the determining that the user entered a predetermined range of the location.

29. The system of claim 10, wherein the media asset function includes placing an order for the media asset.

30. The system of claim 10, wherein the processing circuitry is further configured to:
compare a current time with another time that is associated with the media asset at the location; and
cause the interactive option to be displayed on the user equipment device response to determining that 1) the current time corresponds to the another time and 2) the user is within the predetermined range of the location at the current time.

31. The system of claim 30, wherein the location corresponds to a venue featuring the media asset, wherein the another time corresponds to a start time of the media asset at the venue, and wherein the option includes a discount for consuming the media asset at the venue.

32. The system of claim 10, wherein the processing circuitry is further configured to receive user input defining at least one of the predetermined range of the location and the location-based rule.

33. The system of claim 10, wherein the processing circuitry is further configured to:
detect that the user has left the predetermined range of the location after having entered the predetermined range of the location; and
cause the interactive option to be displayed on the user equipment device in response to detecting the that the user has left the predetermined range of the location.

34. The system of claim 33, wherein the processing circuitry is further configured to:
measure an amount of time representing how long the user remained within the predetermined range of the location before leaving the predetermined range of the location, wherein the interactive option is caused to be displayed further in response to determining that the amount of time exceeds a threshold.

35. The system of claim 33, wherein the interactive option corresponds to purchase of the media asset that is related to another media asset corresponding to the location from which the user has left the predetermined range, and wherein the location corresponds to a venue featuring the another media asset that the user has consumed at the location.

36. The system of claim 10, wherein the processing circuitry is further configured to transmit an identifier of the media asset to a content source from which the media asset is accessible to the user in response to receiving a user selection of the option.

37. The system of claim 10, wherein the processing circuitry is further configured to process information received over an Internet connection from another user that identifies the user and a second location corresponding to the user.

38. The system of claim 10, wherein the option is generated for display temporally with the determining that the user entered a predetermined range of the location.

\* \* \* \* \*